(12) United States Patent
Bruijns

(10) Patent No.: US 7,372,983 B2
(45) Date of Patent: *May 13, 2008

(54) METHOD FOR AUTOMATIC BRANCH LABELING

(75) Inventor: Johannes Bruijns, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 675 days.

This patent is subject to a terminal disclaimer.

(21) Appl. No.: 10/492,447

(22) PCT Filed: Oct. 14, 2002

(86) PCT No.: PCT/IB02/04268

§ 371 (c)(1),
(2), (4) Date: Apr. 13, 2004

(87) PCT Pub. No.: WO03/034336

PCT Pub. Date: Apr. 24, 2003

(65) Prior Publication Data

US 2004/0258296 A1    Dec. 23, 2004

(30) Foreign Application Priority Data

Oct. 16, 2001 (EP) .................................. 01203938

(51) Int. Cl.
*G06K 9/44* (2006.01)
(52) U.S. Cl. ...................... 382/130; 382/154; 382/259
(58) Field of Classification Search ................ 382/128, 382/131, 154, 130, 259
See application file for complete search history.

(56) References Cited

U.S. PATENT DOCUMENTS

| | | | | |
|---|---|---|---|---|
| 4,771,467 | A * | 9/1988 | Catros et al. ................ | 382/130 |
| 6,047,080 | A * | 4/2000 | Chen et al. .................. | 382/128 |
| 6,148,095 | A * | 11/2000 | Prause et al. ................ | 382/131 |
| 6,482,161 | B1 * | 11/2002 | Sumanaweera et al. ..... | 600/454 |
| 6,501,848 | B1 * | 12/2002 | Carroll et al. ............... | 382/128 |
| 6,718,193 | B2 * | 4/2004 | Knoplioch et al. .......... | 600/407 |
| 6,996,260 | B1 * | 2/2006 | Skands et al. ............... | 382/128 |
| 7,003,144 | B2 * | 2/2006 | Yim ........................... | 382/130 |
| 7,194,117 | B2 * | 3/2007 | Kaufman et al. ............ | 382/128 |
| 2002/0090121 | A1 * | 7/2002 | Schneider et al. ........... | 382/128 |
| 2003/0166999 | A1 * | 9/2003 | Liu et al. ..................... | 600/410 |
| 2004/0109603 | A1 * | 6/2004 | Bitter et al. ................. | 382/154 |

OTHER PUBLICATIONS

J. Bruins, "Fully-Automatic Branch Labelling of Voxels in Vessel Structures," Nat. Lab. Technical Note NL-TN 2001-058, Mar. 12, 2001.*

Dokladal, P.; Lohou, C.; Peroton, L.; Bertrand, G., "A new thinning algorithm and its application to extraction of blood vessels,", Apr. 1999, BioMedSim '99, ESIEE.*

(Continued)

Primary Examiner—Brian Werner
Assistant Examiner—Anthony Mackowey

(57) ABSTRACT

The present invention relates to a method of analyzing an object data set in which a tubular structure having a plurality of branches and bifurcations occurs, wherein the object data set assigns data values to positions in a multi-dimensional space, which data values relate to an object to be examined. The invention relates further to a corresponding apparatus and computer program.

3 Claims, 7 Drawing Sheets

OTHER PUBLICATIONS

Figure 1:
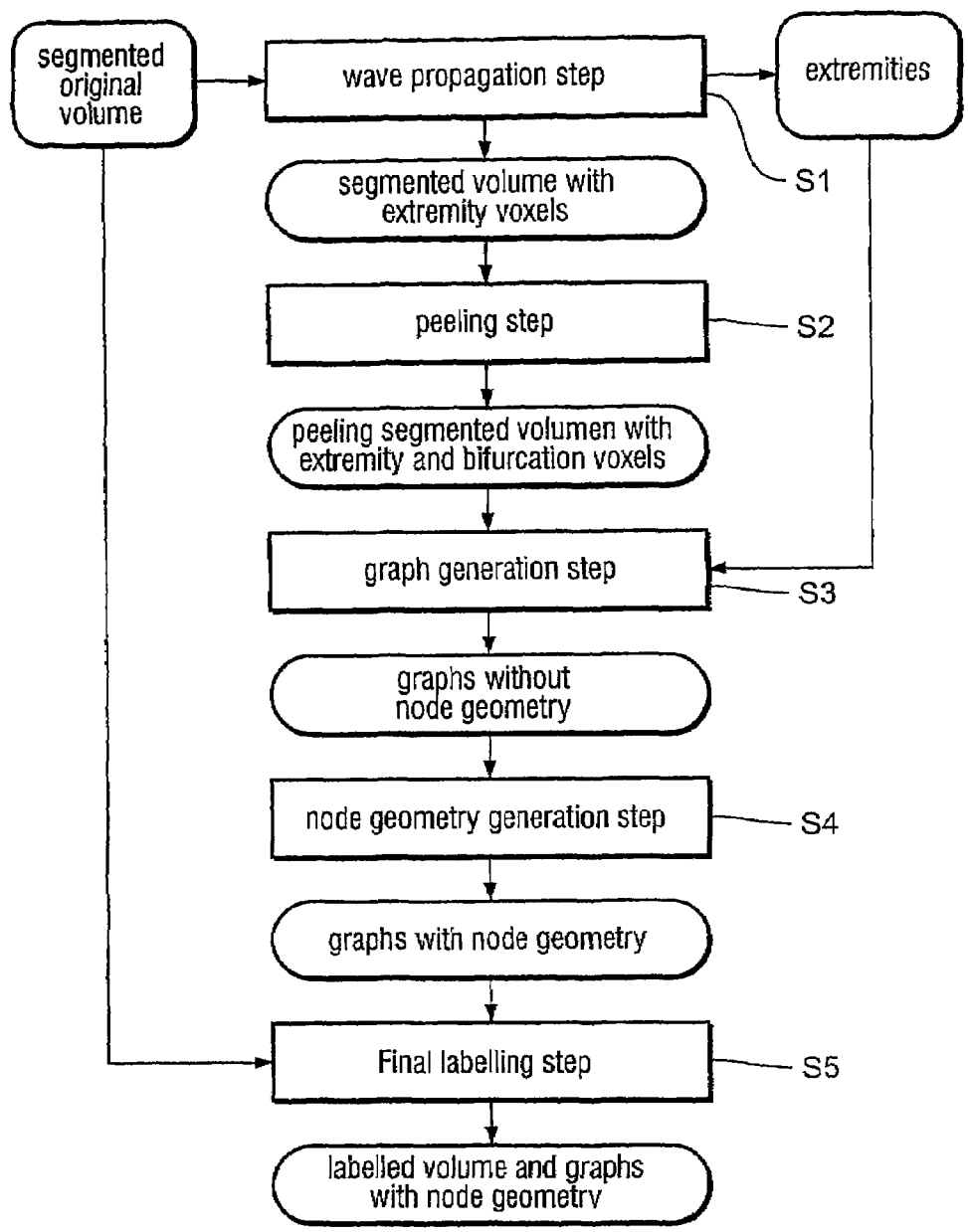

Stefancik, R.; Sonka, M., "Highly automated segementation of arterial and venous trees from three-dimensional magnetic resonance angiography (MRA)," Feb. 2001, International Journal of Cardiac Imaging, vol. 17, No. 1, pp. 37-47.*

Puig, A.; Tost, D.; Navazo, I., "Features detection and navigation on neurovascular trees," Sep. 3, 2000, Pattern Recognition, 2000. Proceedings. 15th International Conference On, IEEE, pp. 76-79.*

Quek, F.; Krirbas, C., "Vessel Extraction in Medical Images by Wave-Propagation and Traceback," Feb. 1, 2001, IEEE Transactions on Medical Imaging, vol. 20, No. 2, pp. 117-131.*

Sato, M.; Bitter, I.; Bender, M.; Kaufman, A.; Nakajima, M., "TEASAR: Tree-structure Extraction Algorithm for Accurate and Robust Skeletons," Oct. 3, 2000, Computer Graphics and Applications, 2000. Proceedings. The Eighth Pacific Conference On, IEEE, pp. 281-287, 449.*

Zahlten, C.; Jurgens, H.; Peitgen, H., "Reconstruction of branching blood vessels from CT-data," Jun. 1994, Proceddings of the Eurographics Workshop on Visualization in Scientific Computing, pp. 41-52.*

* cited by examiner

METHOD FOR AUTOMATIC BRANCH LABELING

The present invention relates to a method of analysing an object data set in which a tubular structure having a plurality of branches and bifurcations occurs, wherein said object data set assigns data values to positions in a multi-dimensional space, which data values relate to an object to be examined. The invention relates further to a corresponding apparatus and computer program.

Nowadays, it is possible to acquire volume representations of the brain which show a clear distinction in grey values between tissue and vessel voxels. Shape extraction, such as measuring a vessel's cross-sectional area, is done by interactively positioning and orienting a plane. The intersection of this plane with the volume gives a 2D image of grey values in which the vessel pixels have a different grey value than the tissue pixels. After selection of the proper object the cross-sectional area can be measured, for example by counting the number of non-black pixels. The plane should be oriented so that it is orthogonal to the vessel whose shape has to be measured. An oblique plane would give the wrong cross-sectional area. Unfortunately, interactively orienting the plane orthogonally to the vessel is a time-consuming and error-prone task.

In J. Bruijns "Semi-Automatic Shape Extraction from Tube-like Geometry", Proceedings Vision Modeling and Visualization 2000, Saarbruecken, Germany, pp. 347-355, November 2000 a new tool, the self-adjusting probe, was introduced. A probe is a combination of a sphere and a plane through the centre of the sphere. After the probe has interactively been placed on a vessel in the neighbourhood of the desired position, the probe automatically adjusts itself so that its plane is orthogonal to the vessel and the centre of its sphere is on the central axis of the vessel. The ellipse radii of the vessel are also estimated. When the probe is aligned, it can be moved along the vessel in the direction of the plane normal. The probe aligns itself again after each step. It is therefore possible to let the probe follow the vessel automatically until the probe detects for example the end of a vessel or the beginning of an aneurysm.

Currently, the self-adjusting probe extracts shapes from a 3D triangle surface model, created for example by a known marching cube algorithm. However, if two vessel branches are close together, it is possible that surface vertices of the neighbour vessel branch are included in the set of selected surface vertices which are used to extract the local shape of the vessel branch investigated. These erroneously included surface vertices deteriorate the accuracy of the estimated shape.

It is therefore the object of the present invention to provide a method of analysing an object data set having an improved accuracy.

This object is achieved by a method comprising the steps of:
  finding the extremities of the branches of said tubular structure,
  forming a skeleton of branches and bifurcations by a peeling step,
  forming directional graphs for the branches of said skeleton between two neighbouring bifurcations or between a bifurcation and an extremity based on said skeleton,
  assigning a label to the positions along the directional graphs, wherein for each branch of each directional graph a unique label is selected,
  determining the geometry of the branches and bifurcations of said tubular structure so that positions can be classified as belonging to either a bifurcation or a branch, and
  assigning a final label to the positions along the branches and of the bifurcations of said tubular structure, wherein for each branch and each bifurcation a unique label is selected.

The invention is based on the idea to give the vessel voxels, and from these, the surface vertices, a unique label per vessel branch of said tubular structure. Now, vertices of neighbour vessel branches can be excluded because their label is different. This new method results also in a set of directed graphs—one for each component—which facilitates fully automatic vessel tracing from one node, i.e. an extremity or bifurcation of the vessel structure, to another node of the same graph.

The fully-automatic branch labelling method according to the invention consists of five steps. Starting point is a segmented voxel volume without tissue inclusions. The elements of this segmented voxel volume are for-example signed bytes, with a 0 for a tissue and a 1 for a vessel voxel. This makes it possible to assign different labels to vessel voxels during these steps. Vessel voxels with a label 1 are called original vessel voxels. Tissue voxels are never changed. The final outcome is a segmented voxel volume in which almost all vessel voxels have a label indicating to which bifurcation or branch they belong and a set of directed graphs describing the topology of the vessels.

In a first step, the extremities of the voxel vessel structures are searched, preferably by applying a wave propagation method, as e.g. described in Zahlten et al., "Reconstruction of Branching Blood Vessels From CT-Data", Proceedings of the Eurographics Workshop on Visualization in Scientific Computing, Rostock, June 1994. In a second step, the segmented voxel volume with the extremities indicated by a special label is peeled in a number of iterations. The resulting skeleton of branches and bifurcations is a good approximation of the centre structure of the vessels. In a third step, the graphs are created. Starting point is the peeled segmented voxel volume with the bifurcation and extremity voxels indicated by special labels. A directed graph is generated for each connected set of vessel voxels in the peeled segmented voxel volume. This graph contains one node for each extremity and one node for each bifurcation voxel. The vessel voxel strings between adjacent nodes are stored in branch lists. Each branch list gets a unique number. The voxels of a branch list get this number as label. In a fourth step, node geometry is generated. Node geometry contains the position and the shape of the centre region of the bifurcation of said tubular structure and the position and the shape of its branch regions. In a fifth step the vessel voxels get their final label. First, the voxels in the branch regions of said tubular structure get the label of the corresponding branch list. Next, the voxels in the centre regions of said tubular structure get a label which is different from the labels of the other centre regions and different from the labels of the branch lists. Finally, the voxels of the branches between two adjacent branch regions of said tubular structure get the label of the corresponding branch list. After the vessel voxels are labelled, a modified marching cube algorithm is applied which generates the surface vertices including the label of their neighbouring vessel voxel.

Preferred embodiments of the invention are defined in the specification. An apparatus for analysing an object data set is also defined in the specification. The invention is further defined by a computer program for implementing the method according to the invention.

According to a preferred embodiment the label of the corresponding branch is assigned as final label to the positions along the branches. Mainly only for bifurcations new final labels have to be selected.

According to another embodiment the geometry of the branches and the bifurcations is determined on the basis of branch spheres and bifurcation spheres resulting in the position and shape of the bifurcations and adjacent branch regions. Thus, voxels in all regions of branches and bifurcations can correctly be labelled thus improving accuracy of the whole method.

Preferably, the branch spheres and bifurcation spheres for branches and adjacent bifurcations are arranged such that the radius of these spheres corresponds to the diameter of the corresponding branch or bifurcation, respectively. Further, the radius of a branch sphere or a bifurcation sphere is derived from the distance transform of the centre position of this sphere. Thus, voxels or bifurcation can be distinguished from branch voxels which is required for correct labelling of voxels in a subsequent step.

The invention is generally applicable for analysis of a multi-dimensional object data set of a tubular object having a plurality of branches and bifurcations, such as lung structures or vessel trees. The object data set can be acquired, for example, by means of various techniques such as magnetic resonance angiography, computed tomography or 3D rotational X-ray angiography. Techniques of this kind produce an object data set with data values representing the structure of (a part of) the vascular system of the patient to be examined.

Figure 2:
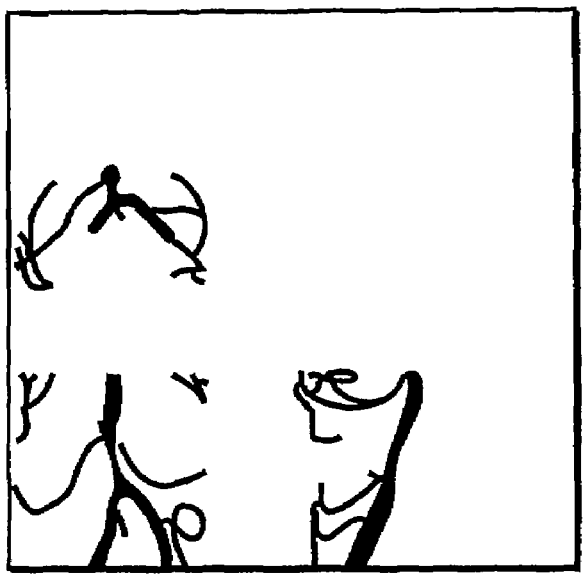
Figure 3A:
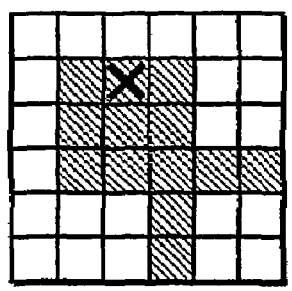
Figure 3B:
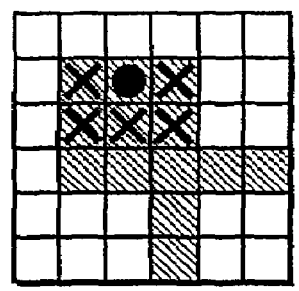
Figure 3C:
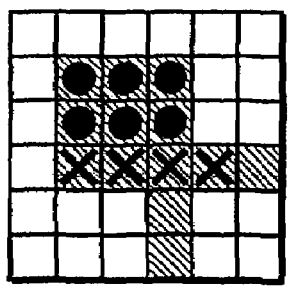
Figure 3D:
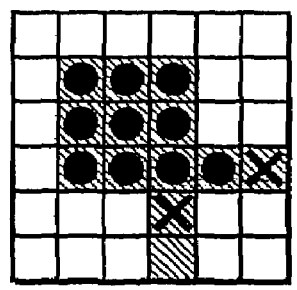
Figure 4:
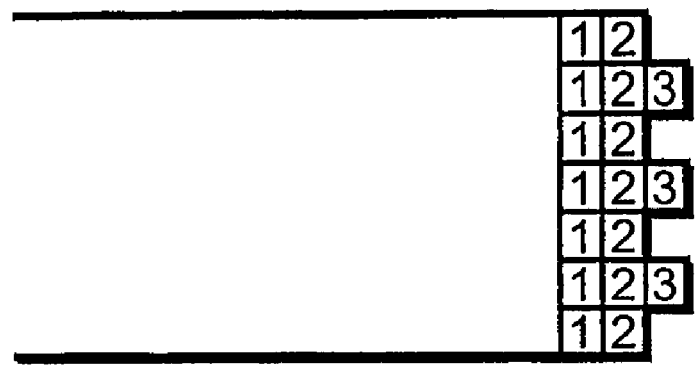
Figure 5:
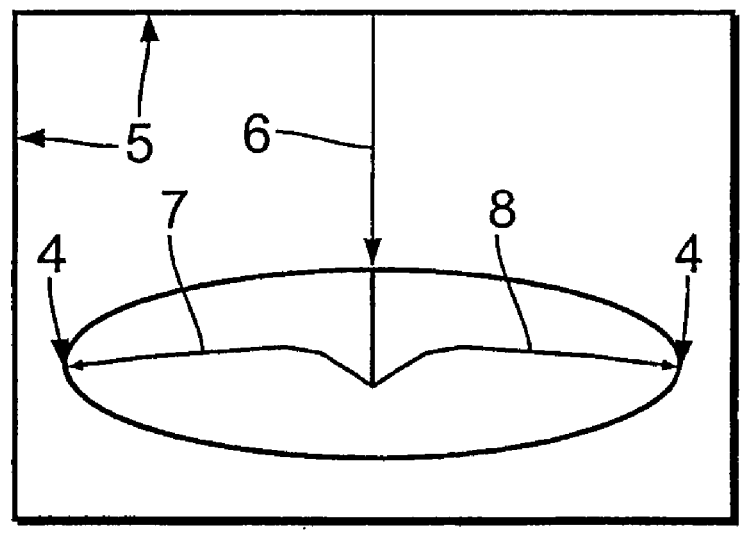
Figure 6:
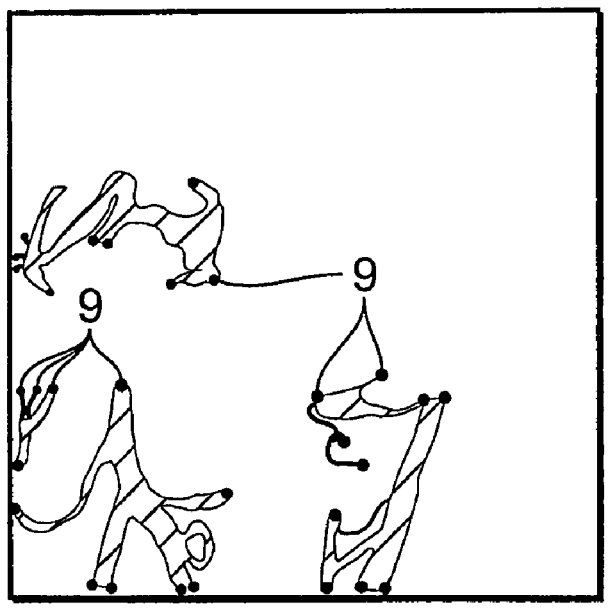
Figure 7:
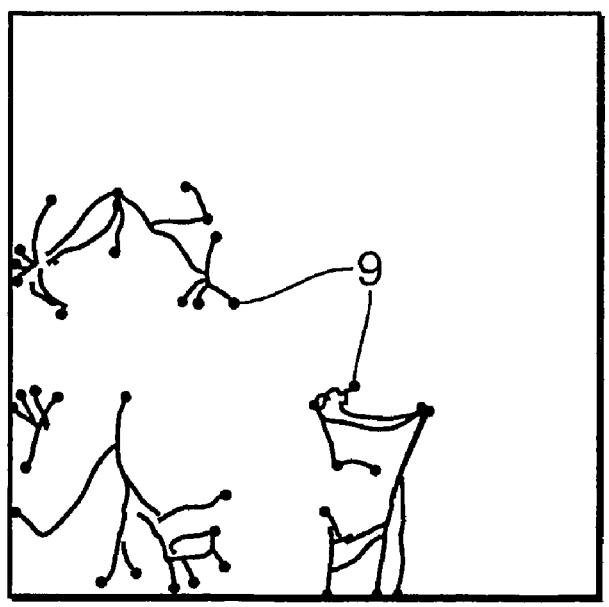
Figure 8:
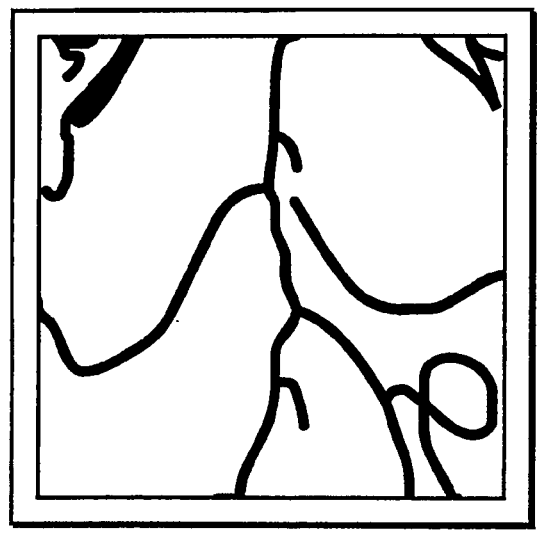
Figure 9:
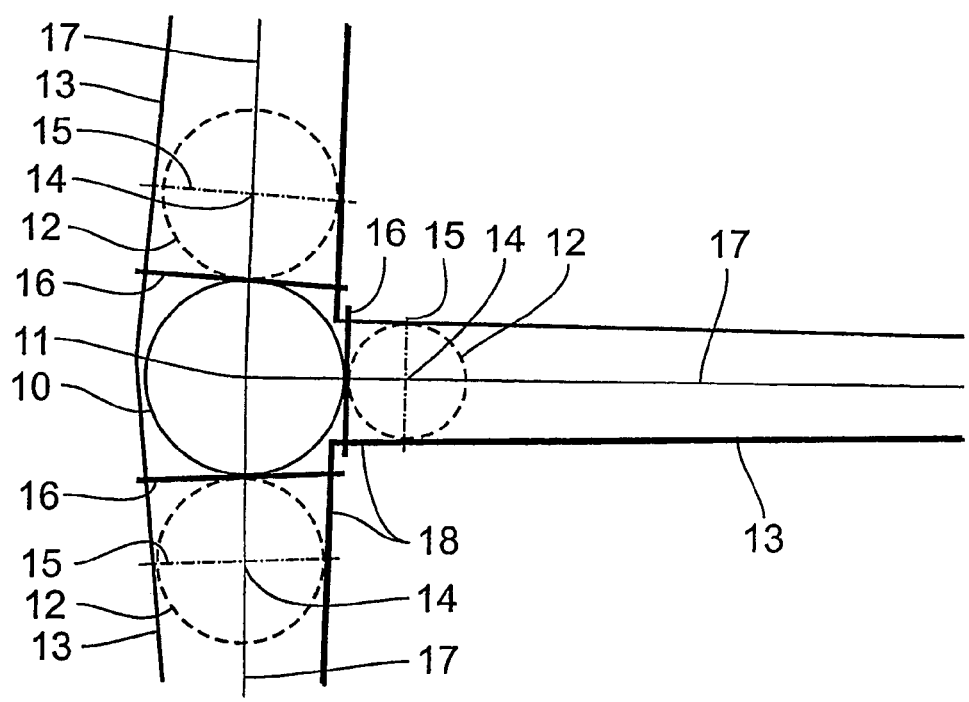
Figure 10:
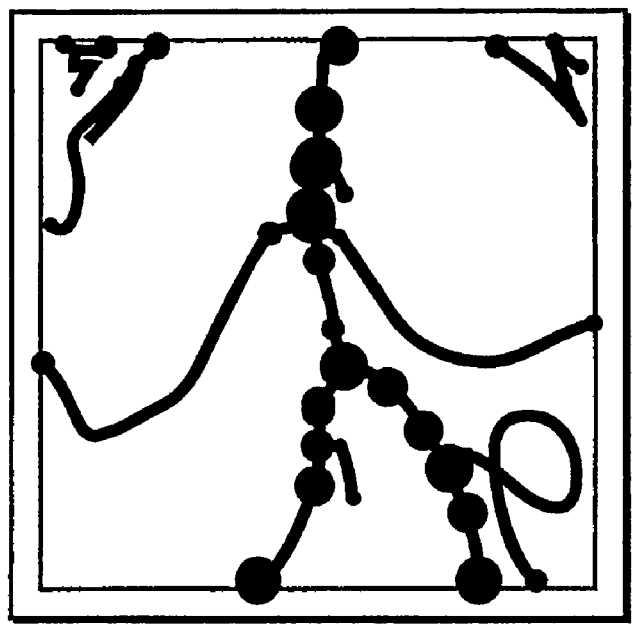
Figure 11:
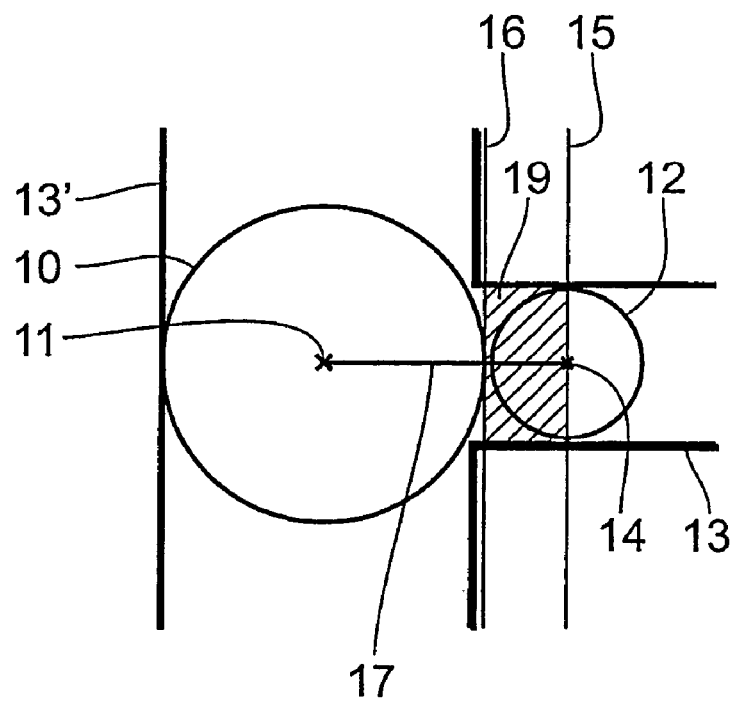
Figure 12:
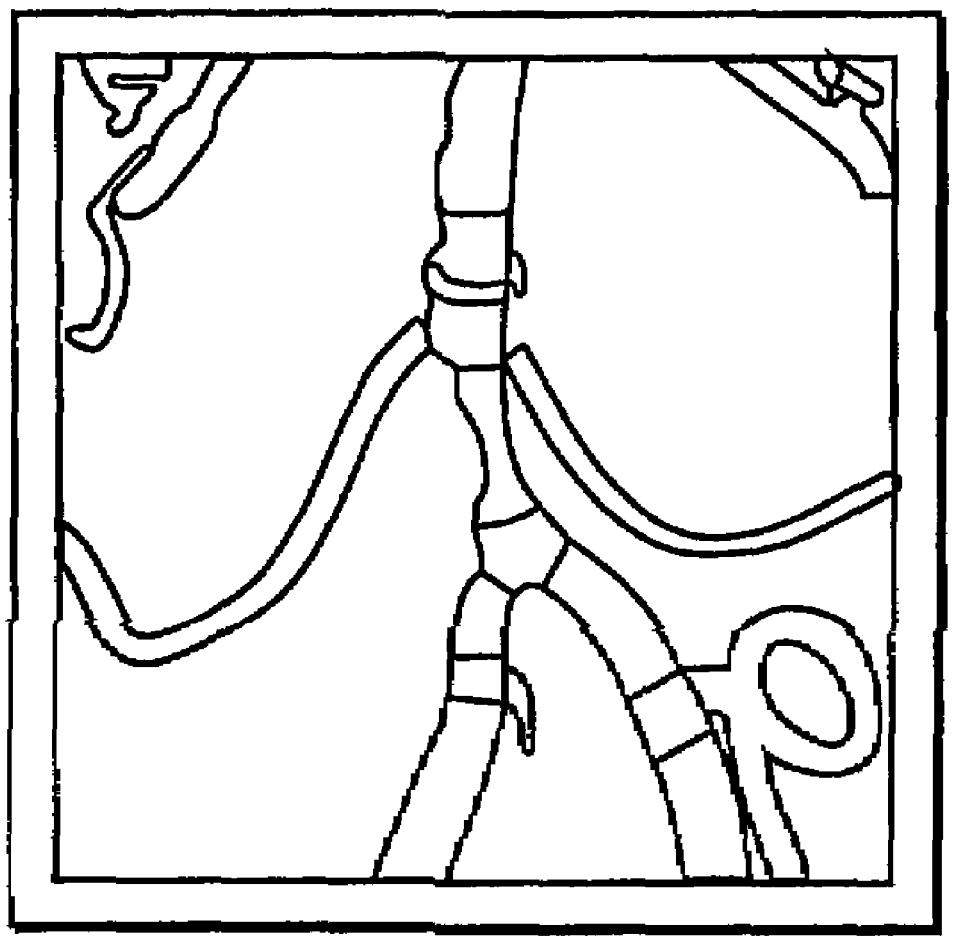

The invention will now be explained in more detail with reference to the drawings, in which FIG. 1 shows a flow chart of the method according to the invention, FIG. 2 shows a pixel map of a segmented voxel volume, FIG. 3 illustrates wave propagation, FIG. 4 illustrates splitting of waves, FIG. 5 shows trial waves according to the invention, FIG. 6 shows the segmented voxel volume with extremities indicated, FIG. 7 shows a peeled segmented volume with extremity and bifurcation voxels indicated, FIG. 8 shows directional graphs obtained from the peeled segmented volume, FIG. 9 illustrates the determination of note geometry, FIG. 10 shows centre and branch spheres along the directional graphs, FIG. 11 illustrates the labelling of voxels and FIG. 12 shows a labelled segmented volume.

FIG. 1 shows a flow chart illustrating the steps of the method according to the invention. These steps will further be explained with reference to the subsequent figures. In the first step S1 the wave propagation method is applied to a segmented voxel volume of a tubular structure, in this particular example of a vessel structure of a patient, as exemplary shown in FIG. 2. Conventionally wave propagation is used to label the grey value voxel volume and to generate the corresponding vessel graph. However, wave propagation is not accurate enough at the bifurcations since the incoming waves continue too long at the bifurcations. According to the invention wave propagation is used to generate the extremities of the vessel voxel structures. If the current wave is at the far end of a branch, one of the voxels of the current wave is selected for inclusion in the set of extremities. The labels assigned during the wave propagation step are ignored. The starting points are generated automatically. Selection by the user is too time-consuming because the segmented voxel volumes generally contain a lot of vessel graphs. These starting points are included in the set of extremities.

A wave, with a branch number greater than 1, is a list of voxel descriptions. A voxel description contains a label with the value the voxel had when the description was created (except for trial waves discussed later), the memory address of the voxel, giving fast access to the current value of the voxel and its index (ix, iy, iz).

Starting with a single seed voxel as initial wave, a new wave with the same branch number is created by generating voxel descriptions for all corner neighbour vessel voxels, i.e. a voxel which shares at least one corner with the voxel examined, of the current wave which were not yet member of any wave. Whether a voxel was already member of a wave can be deduced from the current value of the voxel in the segmented voxel volume because voxels which are included in a wave get the branch number of the current wave. Next, the current wave is deleted and the new wave becomes the current wave.

If the voxels of the current wave are not corner connected, the wave is split in two or more new waves with each a new unique branch number. These new branch numbers are also assigned to the voxels of the split waves. Splitting will occur when a wave travels through a bifurcation of the vessel voxel structures. The wave propagation method is applied to each of the new wave fragments. The process is finished when all new waves are empty. The wave propagation method in general is explained in detail in the above mentioned article of Zahlten et al. In this article the generation of three waves is shown in FIG. 3 which is also included herein as FIG. 3. FIG. 3A shows the initial wave consisting of a single seed voxel (the dark cross). FIG. 3B shows the new wave consisting of the corner neighbour voxels (the five dark crosses) with the voxel of the initial wave marked by a filled circle. FIGS. 3C and 3D show the waves generated from the corner neighbour voxels of the wave of FIG. 3B respectively. FIG. 3D shows the splitting of a wave.

As already mentioned, wave propagation is preferably used—other method are also possible—to find the extremities of the voxel structures. Extremities are found when the new wave is empty. However, in case of a noisy surface the wave will be split in many sub-waves just before the end of a branch is reached. This yields many unwanted extremities. In the example of FIG. 4 there are three waves shown. The first wave contains the voxels labelled 1, the second wave the voxels labelled 2 and the third wave the voxels labelled 3. The voxels of the third wave are not corner connected. So, this wave is split in three new waves. Because these three wave fragments do not have successors, three extremities are generated.

Double waves solve this problem. The waves described in the previous paragraphs are called single waves in the following. A double wave contains old voxels, already present in the previous double wave, and new voxels, which are the corner neighbour vessel voxels of these old voxels. When from such a double wave a new double wave is created, the new voxels of the old double wave are copied to the new double wave as old voxels. Next, the corner neighbour vessel voxels of the old voxels of the new double wave are added as new voxels. The old voxels of a new double wave are also used to test whether the new voxels of this new double wave are corner connected. The new double wave is considered empty if it contains only old voxels.

In the example of FIG. 4 there are three double waves. The first wave contains the voxels labelled 1 as old and the voxels labelled 2 as new voxels. The second wave contains the voxels labelled 2 as old and the voxels labelled 3 as new voxels. The third wave contains the voxels labelled 3 as old and no new voxels. The new voxels of the second double wave are corner connected to each other via the old voxels of this wave. So, this second double wave is not split as was the case for the third single wave. The third double wave contains only old voxels. Hence, this wave is considered empty and the extremity is derived from all voxels of the second double wave, giving only one extremity for this branch end. In the following sections, the waves for wave propagation (except the special waves) are double waves.

Wave propagation is based on corner neighbours. But peeling, graph generation, generation of node geometry and final labelling are based on face neighbours, i.e. a voxel which shares a face with the voxel examined. Indeed, each voxel has 26 corner neighbours and 6 face neighbours. So, using face neighbours instead of corner neighbours saves a significant amount of computing time. Even more important, corner neighbours may yield much more unwanted connections between parallel neighbour vessels. Therefore, before wave propagation is started for a new seed voxel, the original vessel voxels which are face connected, via vessel voxels, to this seed voxel, are labelled as component voxels. The seed voxel itself is also labelled as component voxel.

These face connected original vessel voxels are labelled by the following twin wave algorithm: Two empty waves are created. The first wave is filled with a voxel description of the seed voxel. The seed voxel is labelled as a component voxel. The second wave is filled with voxel descriptions of those original vessel voxels which are face neighbours of the voxels of the first wave. The corresponding voxels are labelled as component voxels. This process is repeated, changing each time the role of the first and second wave, until no original vessel voxels, face connected to the voxels of the current wave are found. The normal wave propagation can now be applied on the component voxels. Vessel voxels which are corner but not face connected to a voxel of this component are now ignored because they do not have the component label.

Wave propagation yields the best results, if the waves travel from wider to narrower vessels. Because wave propagation is used to find the extremities of the vessel structures, seed voxels should be in the neighbourhood of these extremities. Fortunately, very often the large dominant vessel structures start on the boundaries of the volume with their widest vessels. The centre voxels of the widest vessel can be found by means of the distance transform. The distance transform of a vessel voxel is an indicator for the length of the shortest path of face connected vessel voxels to a voxel of a vessel boundary.

It is possible that a local maximum in the distance transform is shared by a number of face neighbour vessel voxels in the same boundary volume slice. So, it is not safe to look for the vessel voxel with a distance transform greater than the distance transform of its face neighbours. Therefore, all voxels in the six boundary volume slices with a distance transform greater than or equal to the distance transform of its face neighbours are stored in a special wave, the so-called seed wave, by means of an insertion sort on the basis of their distance transforms. The insertion sort makes that the seed voxel with the highest distance transform is the first voxel description in the seed wave.

When a voxel is included in the seed wave, the distance transform of its face neighbour vessel voxels is decreased. This prevents that many vessel voxels with the same distance transform as their face neighbours are included in the seed wave. Starting with (and removing) the first voxel description of the seed wave, the wave propagation algorithm including the component selection is carried out. Many voxels of the seed wave will be altered because they belong to the same vessel component. So, skipping and removing the first voxel descriptions of the seed wave from which the corresponding voxels have already been changed, the wave propagation algorithm including the component selection is carried out for all first voxel descriptions of the seed wave from which the corresponding voxels are not yet processed, until the seed wave is empty.

Many components do not start or end on a boundary of the volume. Scanning the segmented voxel volume for not yet processed voxels, will not always result in a seed voxel in the neighbourhood of the extremities of a component. But, by sending trial waves from the start voxel found by scanning, the extremities will be found as shown in FIG. 5. Therein the volume boundary is indicated by 5, the volume scan direction by 6, the left trial path by 7 and the right trial path by 8. The extremities 4 of the trial wave propagation pass are stored in the seed wave instead of in the set of extremities.

Waves do not only have a branch number but also a serial number. This serial number is increased every time a new wave is created from an old wave. The voxel descriptions of the extremity voxels of the trial waves get the serial number of the trial wave as label (not the current value of the extremity voxel as is normally the case). Because the seed wave is filled by means of an insertion sort, the extremity voxel of the trial wave with the highest serial number will be used as seed voxel for a normal wave propagation pass. The trial waves get a special branch number, not used in case of a normal wave propagation pass. So, after the seed voxels are found, the voxels of the component can be reset to their original value. The trial wave propagation pass is alternated with the normal wave propagation pass until all interior components have been processed.

The result of the wave propagation step S1 is a segmented volume with extremity voxels as shown in FIG. 6 where the extremities are indicated as darker spots 9.

In the second step S2, the segmented voxel volume is peeled in a number of iterations by an algorithm similar to that described by Dokládal et al. "A new thinning algorithm and its application to extraction of blood vessels", conference proceedings, BioMedSim '99, ESIEE, April 1999, France. The resulting skeleton of branches and bifurcations shown in FIG. 7 is a faithful approximation of the centre structure of the vessels: the branches are close to the core lines of the vessel branches and the skeleton bifurcations are close to the centres of the vessel bifurcations.

There are many algorithms to create such a skeleton. In the following one particular algorithm shall be explained, which may, however, be replaced by another algorithm as long as the resulting skeleton is a faithful approximation of the centre structure of the vessels.

Starting point is the original segmented voxel volume with the extremity voxels indicated by a special label, the darker spots 9 in FIG. 6. Each iteration creates first a skin layer by labelling the current boundary voxels except the extremity voxels. Each voxel has at most six face neighbours. An original vessel voxel with label one is a boundary voxel if and only if one of these neighbours is not a voxel with a positive label. The label of a boundary is increased with the number of face neighbours with a zero or negative label (boundary voxels removed in a previous iteration).

Checking and removing (if the local topology does not change) all boundary voxels of the current skin layer before creating, checking and removing the boundary voxels of the next inner skin layer, guarantees that the remaining set of voxels approximates the core lines of the vessel graphs. After peeling is finished, bifurcation voxels are marked by a special label. Bifurcation voxels are voxels with more than two positive neighbours in the peeled segmented voxel volume shown in FIG. 7.

The boundary voxels of the current skin layer are checked and possibly removed in order of their label. The volume is traversed from the lower left front corner to the upper right back corner, looking for boundary voxels with the current label. Boundary voxels with exactly one vessel voxel as face neighbour are always removed. Boundary voxels with at least two and at most four vessel voxels as face neighbours are removed unless the local topology changes by removing this voxel. Boundary voxels with exactly five vessel voxels as face neighbour are never removed because removing such a boundary voxel causes a local con-cavity. If a boundary voxel is removed, the labels of its face neighbour boundary voxels are adjusted. Face neighbours with a label greater than or equal to the label of the boundary voxel removed, are immediately processed in decreasing order of their new label before normal scanning from the lower left front corner to the upper right back corner continues.

The topology checks are performed by looking at the corner neighbours of the boundary voxel tested. To this end a cube of 3 by 3 by 3 cells is filled with zero's. The centre cell corresponds to the boundary voxel checked. The other cells correspond to its corner neighbours. A cell is set to one if the corresponding corner neighbour has a positive label. It is possible that some of these cells are equal to one although the corresponding corner neighbour vessel voxel is not face connected, via vessel voxels, to the boundary voxel examined. This can happen when two components are corner but not face connected to each other. These cells are reset to zero. First, resetting the centre cell to zero, should not result in two disjunct face connected sets of positive cells. Secondly, resetting the centre cell to zero, should not decrease the number of face or the number of corner connected sets of zero cells. If one of these two complementary checks fails, the boundary voxel examined should not be removed.

In the third step S3, the graphs for the branches of said skeleton are created. Starting point is the peeled segmented voxel volume as shown in FIG. 7 with the bifurcation voxels indicated by a special label together with the extremities, stored in a special wave by the wave propagation step. A directed graph is generated for each face connected set of positive vessel voxels in the peeled segmented voxel volume. This graph contains one node for each extremity voxel and one node for each bifurcation voxel. A wave is created and stored in this graph for each branch between two nodes. This special wave consists of a list, i.e. a branch list, of voxel descriptions for the face connected positive vessel voxels between these two nodes. Each branch list gets a unique number. The voxels of a branch wave (branch list) get this number as special unique label. An example of the resulting segmented voxel volume is shown in FIG. 8.

The generated graphs facilitate not only fully-automatic vessel tracing from one node to another node, but are also required to label short branches correctly. In this last case, information about the bifurcation structure, especially its size, at one end of the branch is needed for labelling voxels at the other end of the branch. The generated graphs contain this neighbour information.

A graph contains amongst other things the number of branches in the graph, the number of nodes in the graph, a pointer to the list of its branch waves and two pointers, one to the first node and one to the last node of the list of nodes of the graph. A node contains amongst other things a voxel description for the corresponding extremity or bifurcation voxel (called the centre voxel of the node in the following) and the number of branches in this node. The number of branches should be either equal to one or greater than two and less than or equal to six. If the number of branches is equal to one, the node corresponds to an extremity of the vessel structure. Two branches at a node is not possible because nodes are created either for an extremity or a bifurcation. A bifurcation voxel is a voxel with at least three and at most six positive face neighbours.

A node contains for each branch amongst other things a pointer to the corresponding branch wave, a direction number indicating whether the head or the tail of this branch wave is connected to this node and a pointer to the node at the other end of this branch wave. The pointers to other nodes represent the graph structure. The branch waves make it possible to travel from one node to another node going from one voxel to the next voxel of the branch wave.

It should be noted that whether a branch of a node is incoming or outgoing does not imply direction of blood flow at that node.

The graphs are generated by scanning the list of extremities. It is easy to detect whether an extremity is already part of a graph because during the generation of the graph, the voxels visited are made negative. For each positive extremity voxel a node is generated and filled. For each positive face neighbour of the centre voxel of a node a branch wave is generated and filled with the face connected positive vessel voxels until a positive extremity or bifurcation voxel is encountered. A node is generated for the closing extremity or bifurcation voxel and the branch information in the two nodes is updated. The algorithm continues with tracing the branches of the new node.

In case of cycles in the vessel structures, a node may already exist for the closing bifurcation voxel. If so, the bifurcation voxel is negative. Therefore, if no positive extremity or bifurcation voxel is found at the end of a branch wave, the face neighbours of the last positive voxel are inspected for a negative bifurcation voxel. The corresponding node is used to close the branch.

Correct labelling of voxels requires that voxels of a bifurcation can be distinguished from branch voxels. To this end node geometry of the branches and bifurcations of the tubular structure is generated in step S4 as shown in FIG. 9 so that positions can be classified as belonging to either a bifurcation or a branch. In this step the vessel boundary is indicated by 18. Node geometry contains the position and the shape of the centre region of the bifurcation and the position and the shape of its branch regions. First, a centre sphere 10 is created. The position of the bifurcation voxel is used as centre 11 of the centre sphere 10. The radius (in voxels) of the centre sphere is derived from the distance transform of the bifurcation voxel.

Next, a branch sphere 12 is created for each branch 13. The centre 14 of a branch sphere 12 is equal to the position of the voxel of the branch wave so that the branch sphere 12 is just separated from the centre sphere 10. The radius of the branch sphere 12 is derived from the distance transform of the centre voxel of the branch sphere 12. Travelling along and checking each voxel of the branch wave yields the first voxel which fulfils these conditions.

Finally, one branch plane 15 and one centre plane 16 is created for each branch 13. The branch plane 15 is defined by the centre 14 of the branch sphere 12 and the normal 17 which is given by the direction of the connection line from the centre 14 of the branch sphere 12 to the centre 11 of the centre sphere 10. The position of the corresponding centre plane 16 is determined by the intersection of the centre sphere 10 and this connection line 17. Its normal is equal to the normal of the branch plane 15 multiplied with −1.

If the distance in voxels along the connecting branch wave between two bifurcation voxels or between a bifurcation and extremity voxel is small compared with the radii of the centre spheres, centre sphere 10 and branch spheres 12 overlap. Identifying the entities at one end with "first" and at the other end with "second", the following cases can be distinguished:

1. If all voxels of a branch wave are inside the first centre sphere 10, the position of the last voxel is used as centre of the first branch sphere 12. The radius of this branch sphere 12 is in this case multiplied with minus one to indicate this condition.
2. If some of the voxels of this branch wave are outside the first centre sphere 10, but the first branch sphere 12 overlaps the first centre sphere 10 even for the last voxel of the branch wave, this last voxel is used as centre of the first branch sphere 12. This overlap does not harm the final labelling because only the voxels between the branch plane 15 and the corresponding centre plane 16 are members of the branch region.
3. If the second node of the branch is a bifurcation and if the centre of the first branch sphere 12 is inside the second centre sphere, the radius of the first branch sphere 12 is multiplied with minus one to indicate this condition. Indeed, if the centre of a branch sphere 12 is inside one of the centre spheres 10 of a branch between two bifurcations, all voxels of the branch 13 are inside the two bifurcations.

It should be noted that if the node at the other end of the branch 13 is an extremity, all voxels outside the bifurcation including the voxels in the neighbourhood of the extremity are labelled as branch voxels. So, in this case it is not necessary to test whether the centre of the branch sphere 12 of the bifurcation is inside the centre sphere of the extremity.

The branch and centre spheres are shown in FIG. 10. As is clear from this figure, centre spheres are also generated for the extremities. The occasional overlap of spheres is also shown in this figure.

In the fifth step S5, the vessel voxels get their final label. Starting point is the original segmented voxel volume with only tissue and original vessel voxels and the node geometry generated in step S4. The original vessel voxels in a region are labelled by a similar twin wave algorithm as is used for component selection as described above. The difference is that the original vessel voxels should not only be face connected, via vessel voxels, to the initial voxel, but should also fulfil constraints depending on the region currently processed.

First, the voxels in the branch regions 19 of the tubular structure get the label of their branch 13, i.e. of the corresponding branch list. A simplified 2D example of a branch region 13 is given in FIG. 11. The initial voxel for the twin wave algorithm is the centre voxel 14 of the branch sphere 12. The additional constraints are:

1. The distance of the original vessel voxel to the centre 14 of the branch sphere 12 should be less than or equal to twice the radius of the branch sphere 12.
2. The original vessel voxel should reside between the branch plane 15 and the centre plane 16. The first constraint prevents unrestricted growth of the labelled area of a side branch 13 in case the centre sphere 10 is so small that the centre plane 16 for this side branch 13 does not intersect this branch 13 (as to the left of the right vertical vessel boundaries in FIG. 11). In this case a large number of original vessel voxels of the main branch 13', fulfilling the second constraint, are face connected to the centre voxel 14 of the branch sphere 12.

After the voxels in the branch regions 19 are labelled, the voxels in the centre regions 10 of the tubular structure are labelled. Each centre region 10 gets a unique label, different from all branch numbers and different from the labels assigned to the other centre regions and the branch lists. The initial voxel for the twin wave algorithm is the centre voxel 11 of the node. The additional constraints are:

1. The distance of the original vessel voxel to the centre 11 of the centre sphere 10 should be less than or equal to the radius of the centre sphere 10 plus the maximum of the branch radii of the current node.
2. The original vessel voxel should reside inside the "enclosure" of the branch planes 15 of the node.
3. The distance of the original vessel voxel to the position of the current node should be less than or equal to all distances of the original vessel voxel to the positions of the neighbour nodes.

After labelling the original vessel voxels in the branch regions 19, the original vessel voxels of the centre regions 10 are separated from the remaining original vessel voxels in the branches 13 by the already labelled vessel voxels. But when a branch region 19 is skipped because its branch radius is negative or when the distance between the branch plane 15 and centre plane 16 is very small, the original vessel voxels of the centre region 10 are face connected to the original vessel voxels of the branch 13. The first two constraints prevent unrestricted growth of the labelled area in these cases. The third constraint separates the voxels of the current centre region from the voxels of the centre regions of neighbour nodes in case of overlapping centre regions.

After the voxels in the centre regions 10 are labelled, the voxels of the branches 13 between two branch regions 19 of the tubular structure are labelled and get the label of the corresponding branch list. The original vessel voxels of the branch wave are used as initial voxels. But using one original vessel voxel of the branch wave as initial voxel for the twin algorithm will normally result in labelling of most other original vessel voxels of the branch wave. So, only one or two vessel voxels of the branch wave will really be used as initial voxel.

Because the remaining original vessel voxels of a branch are separated from the original vessel voxels in other branches by the labelled voxels of the centre regions, no additional constraints are necessary to prevent unrestricted growth of the labelled area. A labelled segmented volume is shown in FIG. 12.

The following conclusions can be drawn when applying the method according to the invention:

1. The new method for fully-automatic branch labelling of voxels in vessel structures gives better results than the wave propagation method.
2. The wave propagation step deteriorates in case of wide short branches (for example an aneurysm), producing spurious extremities.
3. The quality depends on the smoothness of the surfaces of the voxel structures. A very noisy surface results in many short branches. Smoothing the voxel volume can remove these short branches. However, finding the correct smoothing factor may still require human interaction.
4. The elapsed time for the wave propagation steps depends on the number of components. The elapsed time for the peeling step depends on the number of vessel voxels in the original segmented volume. The elapsed time for the last three steps is negligible compared with the time taken by the first two steps.
5. The method according to the invention results also in a set of directed graphs, one for each component, which facilitates fully-automatic vessel tracing from one node—an extremity or bifurcation of the vessel structure—to another node of the same graph.

The invention claimed is:

1. A method of analyzing an object data set in which a tubular structure having a plurality of branches and bifurcations occurs, wherein said object data set assigns data values to positions in a multi-dimensional space, which data values relate to an object to be examined, said method comprising the steps of: finding the extremities of the branches of said tubular structure, forming a skeleton of branches and bifurcations by a peeling step, forming directional graphs for the branches of said skeleton between two neighboring bifurcations or between a bifurcation and an extremity based on said skeleton, assigning a label to the positions along the directional graphs, wherein for each branch of each directional graph a unique label is selected, determining the geometry of the branches and bifurcations of said tubular structure so that positions can be classified as belonging to either a bifurcation or a branch, and assigning a final label to the positions along the branches and of the bifurcations of said tubular structure, wherein for each branch and each bifurcation a unique label is selected, and wherein the geometry of the branches and the bifurcations is determined on the basis of branch spheres and bifurcation spheres resulting in the position and shape of the bifurcations and adjacent branch regions.

2. The method of claim 1, wherein the branch spheres and bifurcation spheres for branches and adjacent bifurcations are arranged such that the radius of the spheres corresponds to the diameter of the corresponding branch or bifurcation, respectively.

3. The method of claim 1, wherein the radius of a branch sphere or a bifurcation sphere is derived from the distance transform of the centre position of the sphere.

* * * * *